United States Patent [19]

Hashimoto et al.

[11] Patent Number: 4,579,190

[45] Date of Patent: Apr. 1, 1986

[54] POWER UNIT SWING TYPE MOTORCYCLE

[75] Inventors: Michiyoshi Hashimoto; Katsumi Kimura, both of Saitama, Japan; Hisafumi Shako, Zellik, Belgium

[73] Assignee: Honda Giken Kogyo Kabushiki Kaisha, Tokyo, Japan

[21] Appl. No.: 539,206

[22] Filed: Oct. 5, 1983

[30] Foreign Application Priority Data

Oct. 5, 1982 [JP] Japan ................. 57-174783

[51] Int. Cl.⁴ ............................................. B62K 11/04
[52] U.S. Cl. ..................................... 180/227; 180/61; 180/228
[58] Field of Search ............... 180/219, 230, 227, 228, 180/205, 206, 207, 63, 61

[56] References Cited

U.S. PATENT DOCUMENTS

| 4,019,594 | 4/1977 | Koyama | 180/227 |
| 4,169,512 | 10/1979 | Ishikawa | 180/228 |
| 4,436,174 | 3/1984 | Morisono | 180/228 |
| 4,441,574 | 4/1984 | Kohyama | 180/219 |
| 4,460,057 | 7/1984 | Kohyama | 180/219 |
| 4,480,711 | 11/1984 | Satoh | 180/219 |

FOREIGN PATENT DOCUMENTS

| 481761 | 6/1953 | Italy | 180/219 |
| 2074961 | 11/1981 | United Kingdom | 180/206 |

Primary Examiner—David M. Mitchell
Assistant Examiner—Everett G. Diederiks, Jr.
Attorney, Agent, or Firm—Armstrong, Nikaido, Marmelstein & Kobovcik

[57] ABSTRACT

A power unit swing type motorcycle provided with a foot floor positioned lower than a line connecting the center of the front wheel axle and that of the rear wheel axle, and a power unit disposed so that its center of gravity is located substantially on the said line.

4 Claims, 8 Drawing Figures

POWER UNIT SWING TYPE MOTORCYCLE

BACKGROUND OF THE INVENTION

1. Field of the Invention

The present invention relates to a power unit swing type motorcycle having a foot floor.

2. Description of the Relevant Art

In general, motorcycles, especially small-sized and light power unit swing type motorcycles, are provided with front and rear wheels having a diameter of 8 to 12 inches. It is known that the use of wheels of a larger diameter ranging from 16 to 18 inches would improve the running characteristic and the going-straight-ahead characteristic.

However, in the case of a motorcycle having such large-diameter wheels, its center of gravity becomes higher, and in case the motorcycle has a foot floor, it becomes difficult to balance itself during running. Further, the motorcycle inevitably becomes longer. If its length is set at the same value as the length of a motorcycle having wheels of a smaller diameter, the foot floor inevitably becomes shorter, thus resulting in that the running stability is extremely deteriorated and it becomes difficult for the driver to ride the motorcycle.

The present invention has been accomplished for overcoming the above-mentioned problems associated with the adoption of large-diameter wheels in a power unit swing type motorcycle having a foot floor.

SUMMARY OF THE INVENTION

According to the present invention, there is provided a power unit swing type motorcycle including a body frame, a seat supported on the body frame, a front fork attached steerably to the front portion of the body frame, a front wheel supported rotatably by the front fork, a power unit connected to the body frame vertically pivotably, a rear wheel supported by the power unit so that it can be driven by the power unit, at least one damper interposed between the power unit and the body frame, and a foot floor attached to the body frame, the front and rear wheels having a relatively large diameter, the foot floor being disposed so that in a non-loaded state the floor surface thereof is positioned lower than a line connecting the center of the axle of the front wheel and that of the axle of the rear wheel, and the power unit being disposed so that its center of gravity is positioned substantially on the above line. The motorcycle further includes a head tube for the front fork, wherein the body frame comprises a main frame and a rear frame which is connected and fixed to the rear end portion of the main frame, the main frame comprising a single pipe of a large diameter having a generally L-shaped side, which is connected and fixed at its fore end to the head tube and which extends downward from that connection substantially vertically and then extends horizontally rearwards in a position sufficiently lower than the above-mentioned line connecting both axles.

Accordingly, it is an object of the present invention to provide a power unit swing type motorcycle which adopts front and rear wheels of a relatively large diameter thereby improving the running characteristic and the going-straight-ahead characteristic while preventing its center of gravity from becoming higher to thereby make it easy to get a balance during running.

It is another object of the present invention to provide a power unit swing type motorcycle which, notwithstanding the adoption of front and rear wheels of a relatively large diameter, can prevent the increase of its length and can be provided with a foot floor having a sufficient length.

A preferred embodiment of the present invention will be described in detail hereinunder with reference to the accompanying drawings, from which further features, objects and advantages of the present invention will become apparent.

DETAILED DESCRIPTION OF A PREFERRED EMBODIMENT

Figure 1:
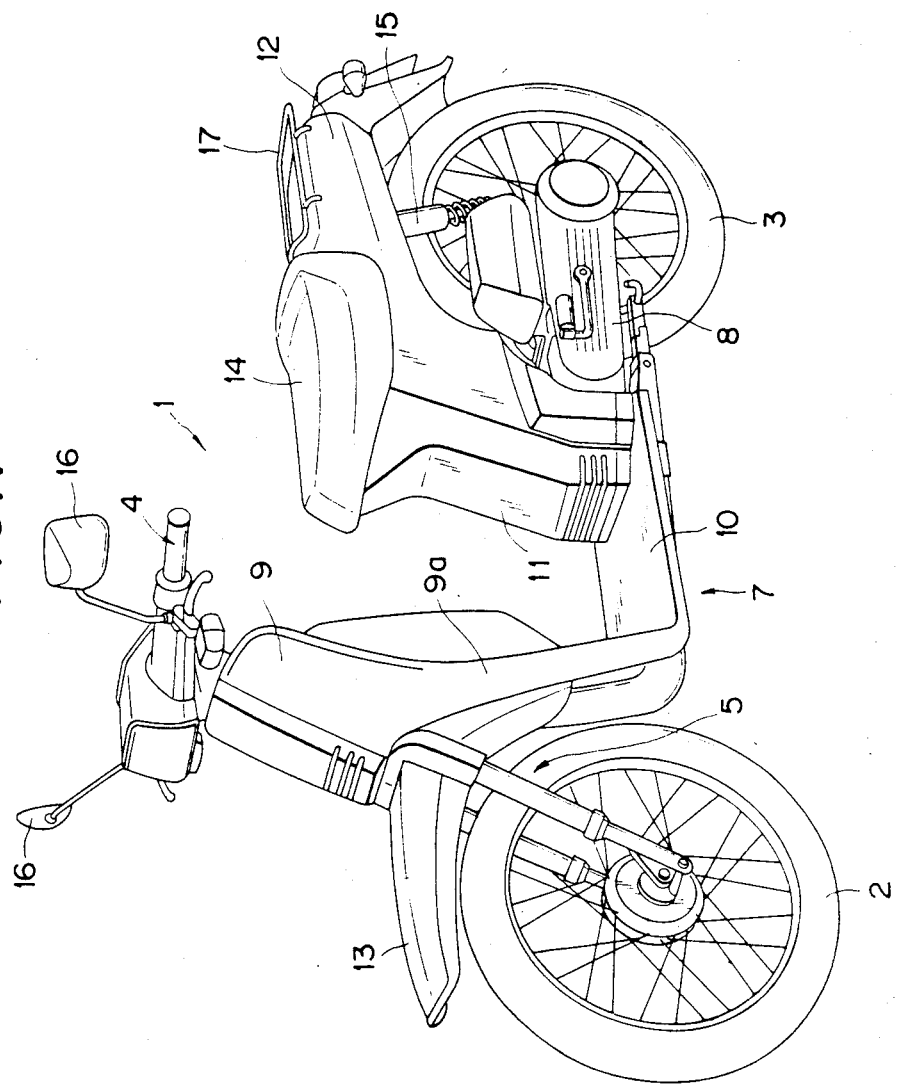
FIG. 1 is a perspective view of the entirety of a motorcycle embodying the present invention.
Figure 3:
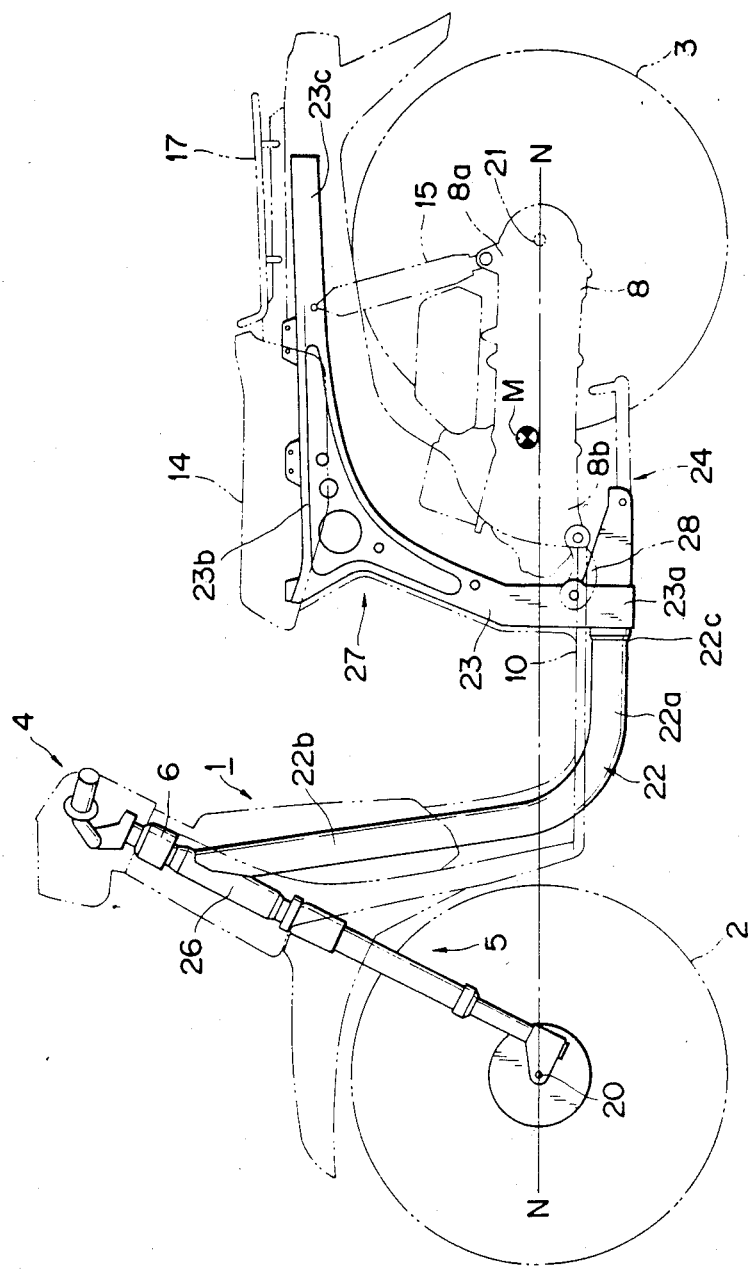
FIG. 3 is a view showing a frame of the motorcycle shown in FIG. 2.
Figure 8:
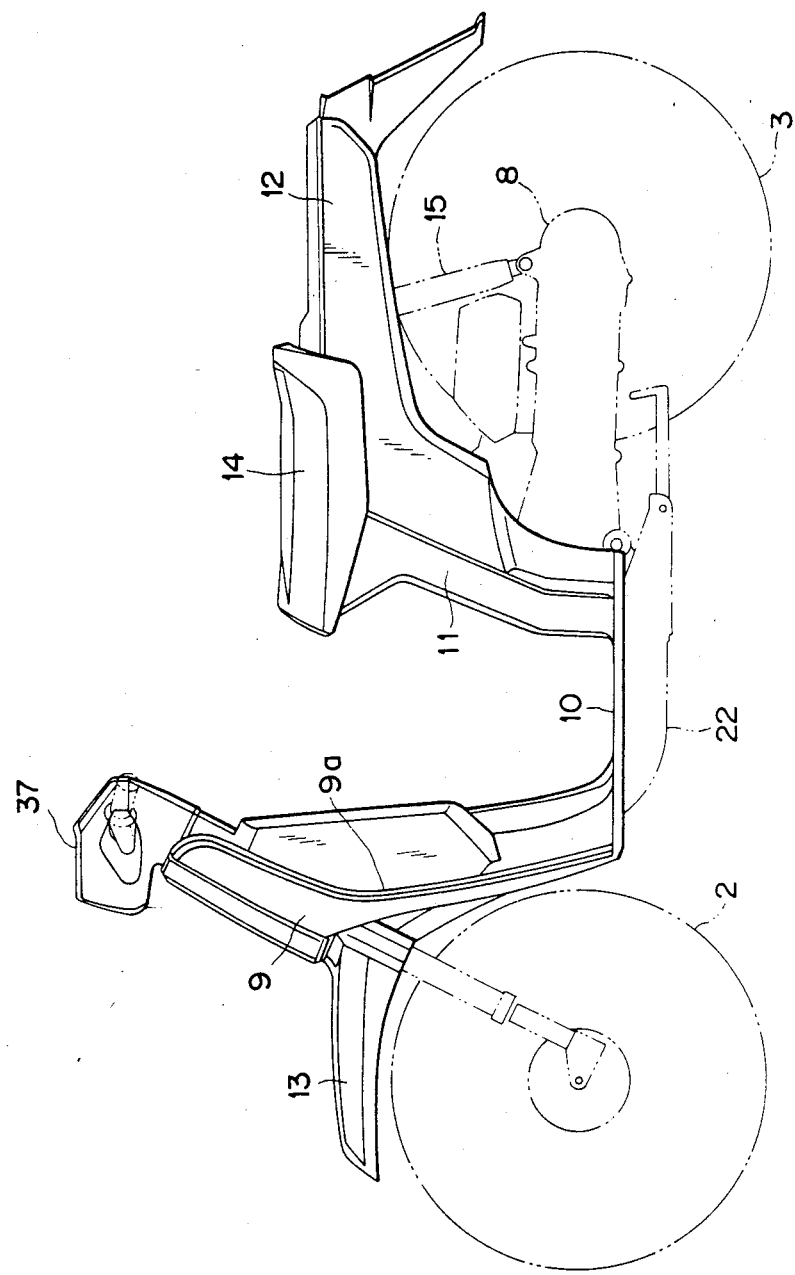
FIG. 8 is a side view of a cover member of the motorcycle of FIG. 1.

Referring to FIG. 1, the reference numeral 1 denotes a motorcycle according to the present invention which motorcycle is in a non-loaded state. The motorcycle 1 has a front wheel 2 which serves as a steering wheel and a rear wheel 3 which serves as a driving wheel, the front and rear wheels 2 and 3 having a relatively large diameter of 18 inches. The front wheel 2 is connected to a handle 4 through a front fork 5 of a known type and a top bridge 6 which is shown in FIG. 3. The motorcycle 1 is steered by operation of the handle 4. The rear wheel 3 is supported rotatably by the rear portion of a power unit 8. The power unit 8, which contains an engine, a transmission case, etc., is connected at its front portion to a vehicle body 7 vertically pivotably. The vehicle body 7 is composed mainly of a frame member which is shown in FIG. 3 and a cover member which is shown in FIG. 8. As to the frame member, it will be described later.

In FIG. 1, the cover member consists of a front cover portion 9 having an upper main portion (not numbered) for covering a head tube (not shown) above the front wheel 2 and a leg shield portion 9a extending downwardly from the upper main portion, which leg shield portion 9a has a larger longitudinal dimension than that of the upper main portion, a foot floor portion 10 contiguous to the lower part of the shield portion 9a, the foot floor portion 10 being flat and having a sufficient open space thereabove, a seat post cover portion 11 which extends upward from the rear part of the floor portion 10 so as to cover a seat post (not shown), and a rear cover portion 12 which extends rearward from the upper part of the seat post cover portion 11 to provide a cover over the rear wheel 3. Between the front cover 9 and the front wheel 2 is disposed a front fender 13, and on the upper part of the seat post cover portion 11 is mounted a seat 14 which is supported substantially by the seat post (not shown). Further, one damper 15 is interposed between the rear portion of the vehicle body and that of the power unit 8. The motorcycle shown in FIG. 1 is further provided with accessories such as mirrors 16 and a rear carrier 17, but as to known members having no substantial bearing on the present invention, explanation will be omitted.

Figure 2:
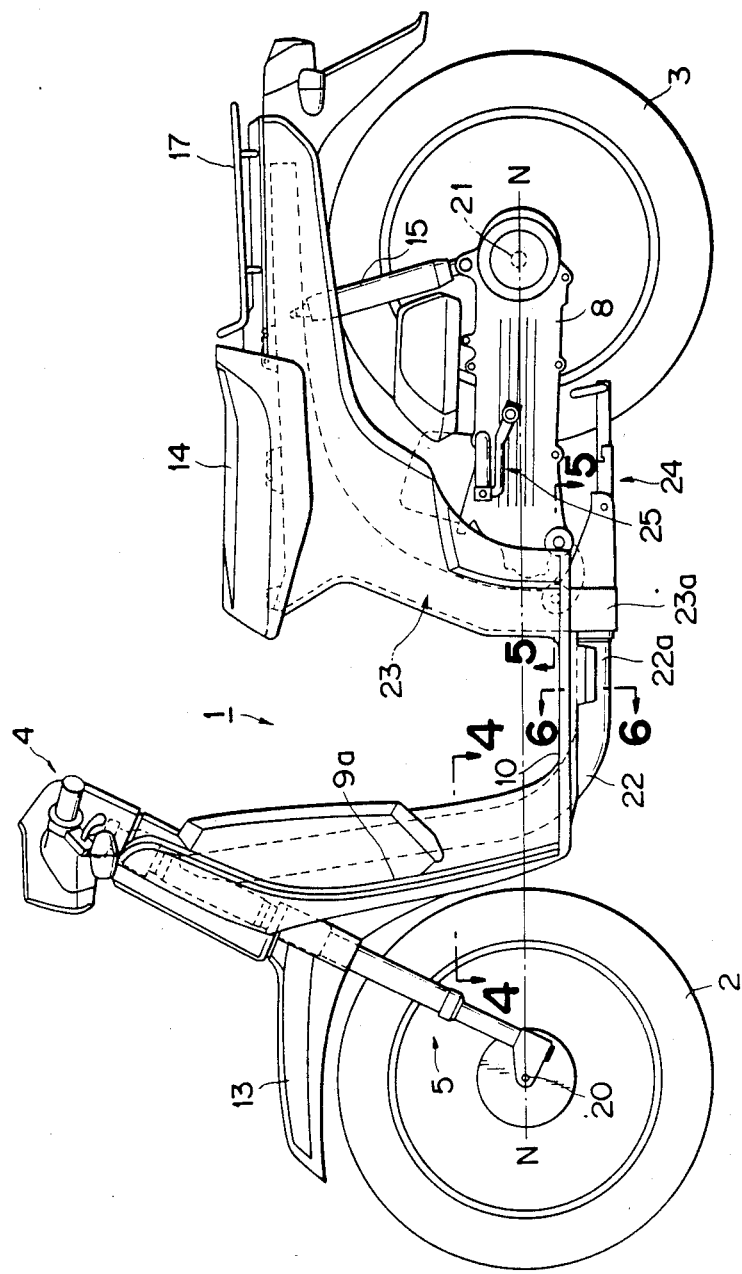
FIG. 2 is a side view of the entirety of the motorcycle shown in FIG. 1.

Referring now to FIGS. 2 and 3, FIG. 2 illustrates a side view of the motorcycle of FIG. 1, and in FIG. 3 the front fork 5 and the vehicle frame are shown in solid lines for a better understanding.

As shown in FIG. 2, the foot floor portion 10 is disposed in a position lower than line N—N connecting the centers of an axle 20 of the front wheel 2 and an axle 21 of the rear wheel 3, which axle 21 is located in a vertically intermediate position of the power unit 8. When the motorcycle 1 is viewed from a side thereof, there are exposed just under the foot floor portion 10 a lower horizontal portion 22a of a main frame 22 and a lower end portion 23a of a seat post 23, which portion 23a is connected to the rear end part of the lower horizontal portion 22a. The reference numerals 24 and 25 in FIG. 2 denote a parking stand end an engine starting kick pedal, respectively.

The body frame of the motorcycle 1 will now be described with reference to FIG. 3. The fore end of the main frame 22 is connected and fixed as shown to the back of a head tube 26 through which is rotatably inserted a steering shaft which interconnects the handle 4 and the front fork 5. The main frame 22 comprises a single large-diameter pipe member of a generally L-shaped side having a down-tube portion 22b which extends downward substantially vertically from the connection with the head tube 26 and also having the above-mentioned lower horizontal portion 22a which bends rearwards in a position sufficiently below the foregoing line N—N and extends horizontally backward. From a rear end part 22c of the lower horizontal portion 22a of the main frame 22 there extends upward the seat post 23 substantially vertically. The seat post 23 is integrally provided with an upper end portion 23b which supports the seat 14 and a seat rail portion 23c which extends rearward substantially horizontally from the upper end portion 23b. These portions 23b and 23c as well the lower end portion 23a are formed integrally by pressing of a steel plate. This pressed member having a generally inverted L-shaped side is provided one on each side of the vehicle body, and the pressed members thus disposed on both sides of the vehicle body are interconnected to constitute a rear frame 27. The main frame 22 and the rear frame 27 are disposed centrally of the motorcycle's lateral dimension.

On the other hand, the power unit 8, which is relatively heavy, is disposed so that its center of gravity M is positioned substantially on the line N—N. As previously noted, moreover, an upper rear portion 8a of the power unit 8 is connected to the seat rail portion 23c through a single damper 15, while a lower front portion 8b thereof is connected through a link 28 to the seat post 23 vertically pivotably in a position just under the line N—N and just above the connection between the lower end portion 23a of the seat post and the rear end part 22c of the lower horizontal portion 22a of the main frame 22.

Figure 4:
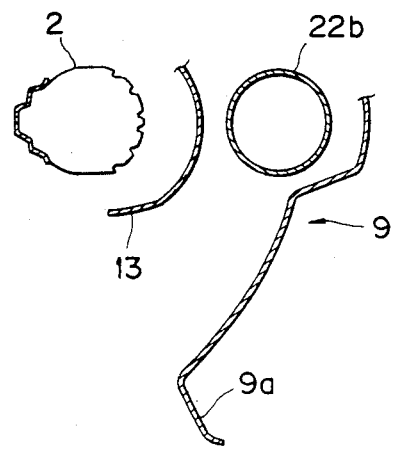
FIG. 4 is a sectional view taken along line 4—4 in FIG. 2.

Referring now to FIG. 4, which is a sectional view taken along line 4—4 in FIG. 2, there is shown an arrangement of the cover member in the vicinity of the down-tube portion 22b. The front fender 13 is biased to the down-tube side from an intermediate portion between the front wheel 2 and the down-tube portion 22b. The front cover 9 passes the back of the down-tube portion 22b, extends while bending forward and then bends at an end portion thereof rearwardly of the vehicle body to form the leg shield portion 9a.

Figure 5:
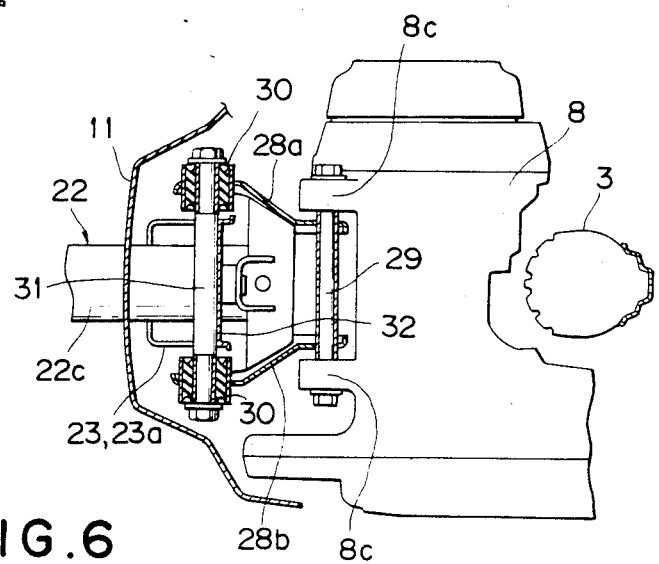
FIG. 5 is a sectional view taken along line 5—5 in FIG. 2.

Referring now to FIG. 5, which is a sectional view taken along line 5—5 in FIG. 2, there is shown a structure of the link 28 and its vicinity. The link 28 comprises symmetrical right and left members 28a and 28b. The rear portions of the link members 28a and 28b are fixed to a bolt 29 which is inserted and fixed between a pair of boss portions 8c formed at the fore end of the power unit 8, while the front portions thereof are connected vertically pivotably through rubber members 30 to a bolt 31 which is fixed to the seat post 23 in a position above the rear end part 22c of the lower horizontal portion 22a of the main frame 22. Further, just before the seat post 23, the seat post cover portion 11 faces the seat post 23 so as to cover the seat post.

As will be seen from FIG. 5, the seat post 23 is in the form of channel which is open rearwards, and between its rear ends is fixed a cross member 32 for enhancing the strength and rigidity of the seat post 23. The cross member 32 extends from the pivotal connection of the link 28 to the seat post 23 up to a substantially intermediate portion of the seat post 23. The other portion of the rear frame 27 than the portion closed with the cross member is in the form of a downwardly opened channel.

Figure 6:
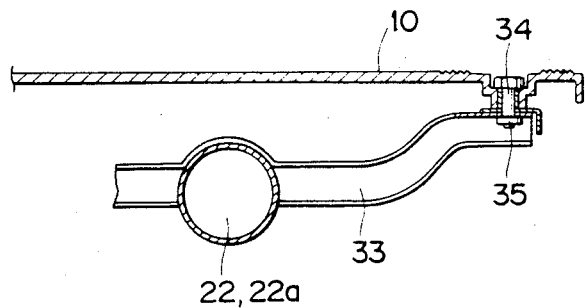
FIG. 6 is a sectional view taken along line 6—6 in FIG. 2.

Referring now to FIG. 6, which is a sectional view taken along line 6—6 in FIG. 2, there is shown the relation between the foot floor portion 10 and the main frame 22. The foot floor portion 10 is in the form of a flat plate having width and length large enough to put thereon the driver's feet in a squarely arranged manner, and it is supported by a support member 33 with the floor portion fixed by bolt 34 and nut 35 to both end portions of the support member 33, which support member is fixed onto the lower horizontal portion 22a of the main frame 22.

Figure 7:
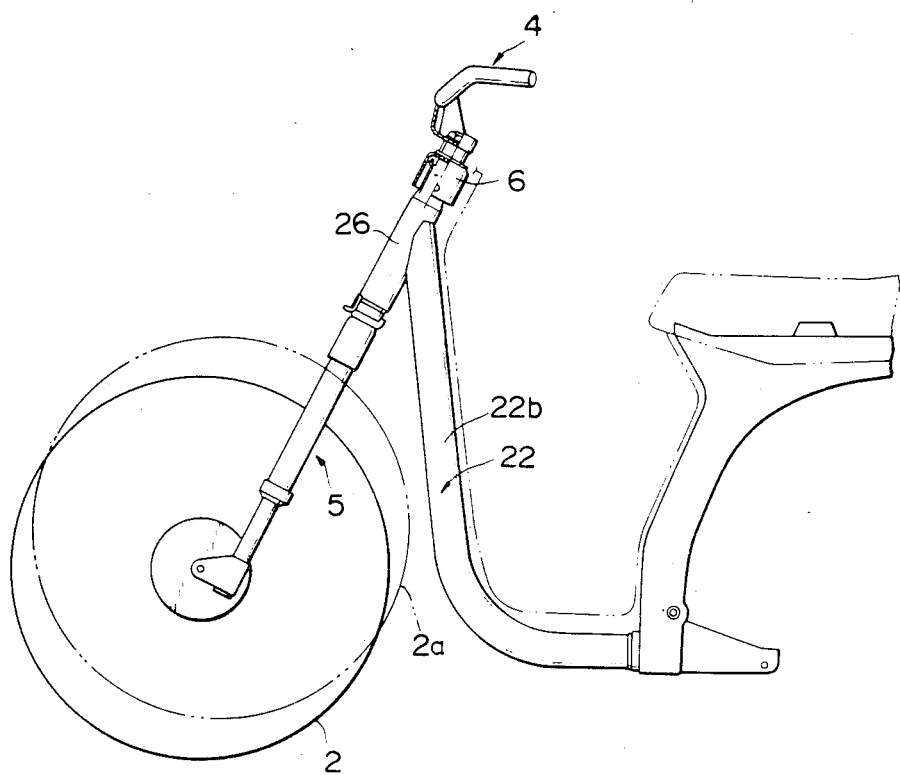
FIG. 7 is a side view of the front portion of the frame of the motorcycle shown in FIG. 1.

Referring now to FIG. 7, the main frame 22 is connected and fixed to the head tube 26 in such a manner that it extends downward substantially vertically, and therefore, as shown in the figure, the area of that connection is set relatively large. On the other hand, the down-tube portion 22b of the main frame and the front wheel 2 are set in such a relation that even when the front wheel is in its highest position 2a, it does not strike against the down-tube portion 22b.

Referring now to FIG. 8, there are shown the constituent portions of the cover member of the motorcycle 1. The front cover portion 9, foot floor portion 10, seat post cover portion 11 and rear cover portion 12 are integrally assembled in advance. In assembling the motorcycle, first the front fender 13 is attached to the frame member, then the cover member is mounted and thereafter a headlight cover 37 and the seat 14 are mounted.

The motorcycle 1 constructed as above has the following advantages.

The running characteristic and the going-straight-ahead characteristic are improved because of the adoption of the front and rear wheels 2 and 3 of a diameter as large as 18 inches in the small-sized and light power unit swing type motorcycle.

Besides, since the down-tube 22b extends downward substantially vertically from the head tube 26 and is bent rearwards so as to extend horizontally backward in a position sufficiently below the line N—N between the axle 20 of the front wheel 2 and the axle 21 of the rear wheel 3 to thereby form the horizontal rear portion 22a of the main frame 22 and the flat foot floor portion 10 is formed thereon, the length and area of the foot floor portion 10 can be set large and the floor portion can be disposed below the line N—N. Consequently, the driver's feet are placed below the line N—N, so the balancing characteristic of the motorcycle during running is improved to a remarkable extent. Further, since the floor portion 10 is positioned low and is flat, the driver can move his feet freely, so can get a balance easily and ride the motorcycle in an extremely easy posture. Such a construction of the main frame is further advantageous in that the increase of the length of the motorcycle can be prevented while maintaining the length of the foot floor portion at a sufficiently large value.

Additionally, since the center of gravity M of the power unit 8 which is relatively heavy is located substantially on the line N—N, the center of gravity of the motorcycle itself becomes lower and it becomes easier to get a balance.

Although a torsional moment is induced around the line N—N between the axles of the front and rear wheels, the value of such torsional moment can be kept to a minimum because the center of gravity of the power unit 8 is located on the line N—N. In this connection, since the link 28 for connecting the power unit 8 to the seat post 23 of the vehicle frame is disposed substantially just under the line N—N, it is difficult to be influenced by such torsional moment. Besides, since the link 28 is connected to the portion of the seat post 23 near the connection of the seat post to the main frame 22, namely, the high strength portion of the seat post, it can fully support the heavy power unit 8.

Although in the foregoing embodiment a single damper is disposed on one side of the motorcycle, it is easily understood that the present invention is applicable also to a power unit swing type motorcycle having two dampers disposed respectively on the right and left sides of the rear portion of the vehicle body.

Further, although in the foregoing embodiment the diameter of the front and rear wheels was set at 18 inches, it is not limited thereto. For example, it may be set at 16 inches. That is, if the wheel diameter is set at a value between 16 and 18 inches, a superior running stability will be obtained.

It is also possible to construct the motorcycle so that in a loaded state the motorcycle assumes the state shown in FIG. 2. In this case, however, the magnitude of the load must be taken into account.

What is claimed is:

1. A power unit swing type motorcycle comprising:
a body frame;
a seat supported on said body frame;
a front fork attached steerably to the front portion of said body frame;
a front wheel supported rotatably by said front fork;
a head tube for said front fork;
said body frame comprising a main frame and a rear frame which is connected and fixed to the rear end portion of said main frame;
said main frame comprising a single pipe of large diameter having a generally L-shape when viewed from the side, said pipe being connected and fixed at its fore end to said head tube and extending downward from said connection substantially vertically and then extending horizontally rearward centrally of the motorcycle lateral dimension;
said rear frame comprising a substantially upwardly vertically extending seat post portion connected to and fixed at its lower end portion to the rear end part of said main frame;
a power unit connected to said seat post portion vertically pivotably through a link, said link including a front end pivotally connected to said seat post portion and a rear end fixed to a lower front portion of said power unit;
a rear wheel supported by said power unit so that it can be driven by said power unit;
at least one damper interposed between said power unit and said body frame;
said front and rear wheels having a diameter of at least sixteen inches;
a foot floor attached to said body frame, said foot floor being flat and disposed above said horizontally rearwardly extending portion of said main frame so that in a non-loaded state the floor surface thereof is positioned lower than a line connecting the center of the axle of said front wheel and that of the axle of said rear wheel;
the pivotal connection of said link to said seat post portion being located in a position just under said line connecting said centers of said front and rear wheel axles and just above said connection between said rear end part of said main frame and said lower end portion of said seat post portion, whereby said power unit is disposed so that its center of gravity is positioned substantially on said line connecting said axles;
said motorcycle further comprising a cover member including a front cover portion having an upper main portion above the front wheel and a leg shield portion extending downwardly from said upper main portion, said leg shield portion having a larger longitudinal dimension than said upper main portion; and
said foot floor being contiguous to a lower part of said leg shield portion.

2. A power unit swing type motorcycle according to claim 1, wherein said body frame is substantially wholly covered by said cover member and wherein said foot floor is formed by a part of said cover member.

3. A power unit swing type motorcycle according to claim 1, wherein said front and rear wheels have a diameter ranging from 16 to 18 inches.

4. A power unit swing type motorcycle according to claim 1, wherein said rear frame further comprises a seat rail portion extending rearwardly and substantially horizontally from the upper end part of said seat post portion so that said rear frame has a generally inverted L-shape when viewed from the side.

* * * * *